Dec. 11, 1951     A. PAWELSKI     2,578,589

MAGNIFYING LOUPE WITH REFLECTOR

Filed Oct. 21, 1948

INVENTOR.
ADAM PAWELSKI

BY

*ATTORNEY*

Patented Dec. 11, 1951

2,578,589

UNITED STATES PATENT OFFICE 2,578,589

MAGNIFYING LOUPE WITH REFLECTOR

Adam Pawelski, Brooklyn, N. Y.

Application October 21, 1948, Serial No. 55,729

1 Claim. (Cl. 88—39)

This invention relates to new and useful improvements in optical appliances for use in assisting the natural vision of a watchmaker, jeweler artisan or the like, and, more particularly, the aim is to provide a lens, as one to be used alone or in auxiliary relation to an ordinarily worn lens for an eye of the watchmaker, in combination with a mirror means adjustable relative to a light source for receiving such light and reflectively directing same onto a particular part of the work.

According to the invention, a common carrier for said lens and for said mirror means is adapted to be mounted on a suitable support of a conventional type worn on the head of a watchmaker. Such a support, for example, could be a pair of spectacles sometimes worn by a watchmaker for bettering his close-up precise vision, or a support of the kind often worn by a watchmaker and incorporating an elongate resilient member, as a resilient metal band, for elastically extending over the top of his head in a more or less fore and aft direction and forwardly terminating in a cradling device for a structure consisting of a cup-shaped mount for a magnifying glass and known in the trade as a loupe.

A feature of the invention is the construction of said common carrier whereby the lens thereof may be adjusted by bodily swinging the same about a substantially horizontal axis, and whereby the mirror means is so mounted, relative to said axis, that said mirror means may be bodily swung about another axis which is changeable in location in response to a swing of said lens as aforesaid but which is always perpendicular to the first-named axis, and whereby, further, the mirror means is tiltable about still another axis, this always at right angles to the second-named axis.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
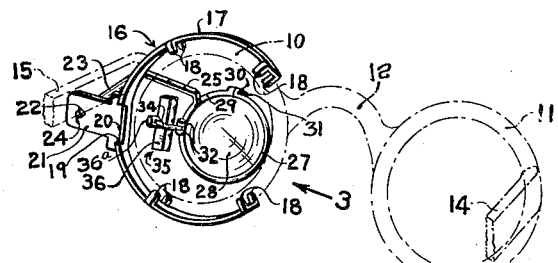
Fig. 1 is a perspective view, showing a now favored embodiment of the invention, as attached to and supported by an ordinary spectacle frame illustrated in dot and dash lines.
Figure 2:
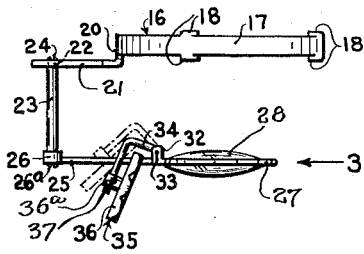
Fig. 2 is a bottom plan view of said embodiment, detached from said spectacle frame.
Figure 3:
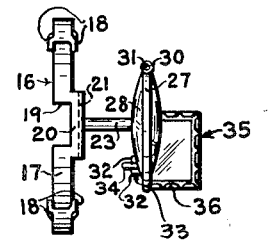
Fig. 3 is a side elevation of said embodiment, looking in the direction of the arrows 3 of Figs. 1 and 2.

Referring to the drawings in detail, and first to Figs. 1-3, the spectacle frame shown in dot and dash lines in Fig. 1 is illustrated as comprising the conventional pair of eyeglass frames 10 and 11 joined by a nose-bridge piece 12; said frame also equipped with a pair of temple pieces 14 and 15, each hingedly connected at its forward end with the outer end of one of the eyeglass frames 10 and 11.

For detachable securement of the new device to a selected one of the eyeglass frames 10 and 11, as to the frame 10, said device includes a clip 16 consisting of a stamping of resilient sheet metal formed to include a curvilinearly extending band 17 of a length sufficient, and so longitudinally spring biased, as to condition such band for clingingly embracing the outer margin of such eyeglass frame along somewhat more than half its perimeter. For holding the clip against sidewise shift thereof, said band integrally carries at suitably spaced intervals therealong pairs of offset tabs 18, one member of each such pair at an opposite side of the band 17. As here shown, four of these pairs of tabs are present, with two pairs thereof spaced along each of the end portions of the band.

For clearing the forward end of the adjacent temple piece 14, the band 17 has a cut out at 19, and the band opposite said cut out is laterally extended as at 20, and at the free end of such extension a finger 21 is integrally and perpendicularly offset therefrom.

Said finger 21 near its outer end is drilled and tapped as at 22, and a forwardly substantially horizontally extended post 23 has its rear end secured to the finger 21 by way of an externally threaded reduced rear end portion 24 of said post, such thread matching the thread in the aperture 22. The post when thus threadedly mounted on the finger 21 is tightened up sufficiently at such mounting to prevent casual rotation of the post. However, according as the post 23 is mounted on the finger 21 as shown in Fig. 1, or reversely mounted on said finger, that is, to have the post extend away from the near side of said finger in Fig. 1, the device is adapted for having its clip snapped onto the eyeglass frame 10 or onto the eyeglass frame 11.

Now continuing the description in terms of the attachment of the new device to the eyeglass frame 10, the forward end of the post 23 is reduced in diameter, and at that portion of said post there is rotatively mounted a primary arm 25, by means including a collar 26 integral with the latter; and the outer end of said reduced portion of the post 23 is drilled and tapped for receiving a tiny screw 26a.

The primary arm 25 at its end remote from the post 23 is formed into a main length 27 of a ring-type mounting frame for a magnifying lens 28; this frame having its complementary length 29 suitably secured at one end to the arm 25 adjacent to the root portion of the length 27. Said frame, where the free ends of its lengths 27 and 29 meet, is provided with a tandem-barrel type of coupling 30 detachably closed by a tiny screw 31.

Fixed on the length 27 of the mounting ring for the lens 28 is a bifurcated member 32 for hingedly mounting in its fork, as by the aid of a tiny screw 33, the eyed end of an L-shaped secondary arm 34. The axis of this hinging of said arm 34 is, it will be noted, at right angles to the axis of pivotal mounting of the primary arm 25 on the post 23.

A mirror means 35, here shown as a glass mirror in a frame 36, is swingably carried at the outer end of the longer limb of the L-shaped secondary arm 34, by means of a journalling mount 36a on the back of said mirror frame and incorporating a tiny screw 37.

With the parts arranged as in Fig. 1, and with the spectacle frame (with or without eyesight aiding lenses in either or both of the eyeglass frames 10 and 11) worn as usual by the watchmaker or jeweler artisan, the new device may be swung relative to the forward end of the post 23 and out of the way when not desired for use. When said device is desired for use, it may be swung relative to said post and placed as desired in a plane in front of and parallel with the eyeglass frame 10. As thus placed, the mirror means 35 may be adjusted as best adapted to reflect good light on the work; this adjustment may be a duplex one, as an adjustment about the axis of the hinge connection between the ring frame for the lens 28 and the L-shaped secondary arm 34 and/or an adjustment about the axis of the tilt mount 36a on the back of the mirror frame where this frame is connected to the said secondary arm 34.

By means of the screw 26a, the primary arm 25 may be locked in a selected angular adjustment on the post 23; by means of the screw 33, the secondary arm 34 may be locked in a selected tilt adjustment relative to the ring frame for the lens 28; and by means of the screw 37, the mirror frame 36 may be locked in a selected tilt adjustment relative to the arm 34.

Figure 4:
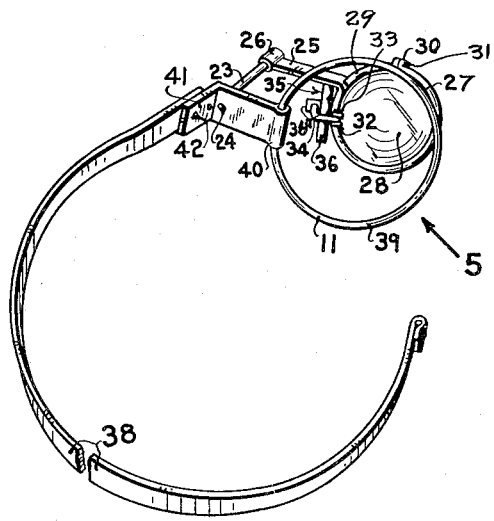
Fig. 4 is a perspective view, showing said embodiment as attached to and supported by a support including a loupe holder.
Figure 5:
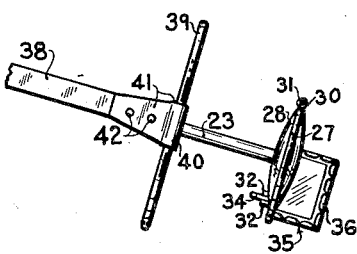
Fig. 5 is a side elevation, looking in the direction of the arrow 5 of Fig. 4.

Referring to Figs. 4 and 5, the new device is here shown as embodied exactly as in Figs. 1–3, all the way from the mirror frame 36 to and including the post 23. Here, however, the new device is illustrated as attached to a support of the kind including an elongate resilient metal band 38 for elastic distension to extend over the top of the watchmaker's head and at its forward end having attached thereto a ring 39 for holding a loupe; the top portion of said ring 39 being fixedly secured as at 40 to the lower limb of a substantially inflexible L-shaped plate 41 directly attached as by rivets 42 to the forward end of the band 38. When the band 38 is applied to the watchmaker's head in the customary way, and so that the last-named limb of the plate 41 extends substantially horizontally, the other limb of said plate will depend vertically. For then mounting the post 23 for horizontal forward extension from the last-named limb of the plate 41, said limb is drilled and tapped near its upper hand to provide there an aperture corresponding to the aperture 22, whereby the post 23, at its aforesaid externally threaded reduced end portion 24, may be secured to said limb, as shown.

With the new device supported as just described, the lens 28 may be swung out of the way; or arranged for use as described in connection with Figs. 1–3, as may also the mirror means 35.

While I have illustrated and described the preferred embodiment of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

Means for supporting an enlarging lens and a mirror for reflecting light onto a selected part of a piece of work in front of one's eye from a support for partially encircling the head on a level with the eyes, said supporting means comprising a post secured at one end to the support and having its other end extended forwardly therefrom, an arm extended right angularly inward from the outer end of said post and having its outer end fixedly secured to the outer end of said post, a ring-like frame continuing from the inner end of said arm and encircling the lens, a bifurcated member extended rearward from said frame closely adjacent and spaced slightly below said arm, said bifurcated member having vertically spaced rearwardly extended portions, a pivot pin extended vertically between said vertically spaced portions of said bifurcated member, an L-shaped arm having one of its arm portions extended forward from said frame on a plane parallel to the length of said post, and means adjustably mounting the mirror in a substantially vertical plane on the forward end of the said one arm portion of said L-shaped arm so that the position of the mirror can be adjusted about the longitudinal axis of that said one arm portion, said L-shaped arm having its other arm portion extended about the periphery of said frame and pivoted at its free end on said vertical pivot pin so that the position of said L-shaped arm and in turn the mirror can be adjusted about the vertical axis of said pivot pin.

ADAM PAWELSKI.

REFERENCES CITED

The following references are of record in the file of this patent:

UNITED STATES PATENTS

| Number | Name | Date |
|---|---|---|
| 575,075 | Stevens | Jan. 12, 1897 |
| 773,750 | Kay | Nov. 1, 1904 |
| 817,902 | Bunker | Apr. 17, 1906 |
| 1,074,145 | Walts | Sept. 30, 1913 |
| 1,145,259 | Moreau | July 6, 1915 |
| 2,175,896 | Jiranek | Oct. 10, 1939 |
| 2,435,728 | Trowbridge | Feb. 10, 1948 |

FOREIGN PATENTS

| Number | Country | Date |
|---|---|---|
| 2,764 | Great Britain | of 1886 |
| 861,310 | France | Oct. 22, 1940 |